(12) United States Patent
Furukawa (10) Patent No.: US 9,896,132 B1
(45) Date of Patent: Feb. 20, 2018

(54) WORKING VEHICLE (71) Applicant: Komatsu Ltd., Tokyo (JP)

(72) Inventor: Hiroyasu Furukawa, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/505,419

(22) PCT Filed: Aug. 22, 2016

(86) PCT No.: PCT/JP2016/074417
§ 371 (c)(1),
(2) Date: Feb. 21, 2017

(87) PCT Pub. No.: WO2017/043300
PCT Pub. Date: Mar. 16, 2017

(51) Int. Cl.
*B62D 21/16* (2006.01)
*B60R 3/00* (2006.01)
*B60P 1/28* (2006.01)
B60K 15/03 (2006.01)
B60R 16/08 (2006.01)
B60R 17/00 (2006.01)

(52) U.S. Cl.
CPC ............... *B62D 21/16* (2013.01); *B60P 1/28* (2013.01); *B60R 3/005* (2013.01); B60K 15/03 (2013.01); B60K 2015/03217 (2013.01); B60R 16/08 (2013.01); B60R 17/00 (2013.01)

(58) Field of Classification Search
CPC .................................... B60K 13/04; B60P 1/28
See application file for complete search history.

(56) References Cited

U.S. PATENT DOCUMENTS

| 2,662,405 | A | * | 12/1953 | Tapscott | G01F 23/02 73/328 |
|---|---|---|---|---|---|
| 2,833,148 | A | * | 5/1958 | Hoyt | G01F 23/02 73/323 |
| 9,033,081 | B1 | | 5/2015 | Yamagoe | |
| 9,205,770 | B2 | * | 12/2015 | Kitaguchi | B60P 1/286 |
| 2008/0023659 | A1 | | 1/2008 | Dietz et al. | |
| 2009/0218875 | A1 | * | 9/2009 | Tamura | B60P 1/28 298/22 C |
| 2013/0069416 | A1 | * | 3/2013 | Kitaguchi | B60P 1/28 298/17 R |
| 2015/0090511 | A1 | * | 4/2015 | Okuda | B60K 13/04 180/89.2 |

(Continued)

FOREIGN PATENT DOCUMENTS

| CN | 101113921 A | 1/2008 |
|---|---|---|
| CN | 104039576 A | 9/2014 |

(Continued)

OTHER PUBLICATIONS

International Search Report dated Oct. 18, 2016, issued for PCT/JP2016/074417.

(Continued)

*Primary Examiner* — Joseph M Rocca
*Assistant Examiner* — Daniel S Yeagley
(74) *Attorney, Agent, or Firm* — Locke Lord LLP (57) ABSTRACT

A working vehicle includes a housing member in which fluid is housed, and a gauge that indicates a remaining amount of the fluid in the housing member. The gauge is disposed at a central portion of the housing member in a longitudinal direction.

8 Claims, 11 Drawing Sheets

(56) References Cited

U.S. PATENT DOCUMENTS

| | | |
|---|---|---|
| 2015/0310678 A1 | 10/2015 | Ito |
| 2016/0208914 A1 | 7/2016 | Kondou et al. |
| 2016/0222629 A1* | 8/2016 | Tsuda .................. B60K 15/063 |
| 2016/0257194 A1* | 9/2016 | Ashikawa .............. B60K 13/04 |
| 2016/0272101 A1* | 9/2016 | Vitale ...................... B60P 1/16 |

FOREIGN PATENT DOCUMENTS

| | | | |
|---|---|---|---|
| CN | 104885132 A | 9/2015 | |
| CN | 105264271 A | 1/2016 | |
| CN | 105737933 A | 7/2016 | |
| JP | 54-080014 U | 6/1979 | |
| JP | 55-110434 U | 8/1980 | |
| JP | 57-003029 U | 1/1982 | |
| JP | 59-150800 U | 10/1984 | |
| JP | 2003-064724 A | 3/2003 | |
| JP | 103438950 A | 12/2013 | |
| JP | 2015-190259 A | 11/2015 | |
| WO | WO 2015129121 A1 * | 9/2015 | ............. B60K 13/04 |

OTHER PUBLICATIONS

Office Action dated Jun. 8, 2017, issued for the Chinese patent application No. 201680001614.9 and English Machine translation.

* cited by examiner

WORKING VEHICLE

FIELD

The present invention relates to a working vehicle.

BACKGROUND

In a working vehicle, a variety of fluids such as fuel, oil, and cooling water are used. A remaining amount of the fluid is checked in an inspection of the working vehicle. In order to check the remaining amount of the fluid, it is often the case that a gauge is provided in a housing member in which the fluid is housed. An inspector checks the remaining amount of the fluid by observing the gauge. For example, in a pre-operation inspection of the working vehicle, the inspector checks a remaining amount of cooling water in a radiator by observing a gauge provided in the radiator.

CITATION LIST

Patent Literature

Patent Literature 1: JP 2015-190259 A

SUMMARY

Technical Problem

When a working vehicle is in a stopped state on an inclined ground surface, even though a housing member for fluid, such as a tank, inclines, a liquid level of the fluid is parallel to a horizontal plane. Therefore, when the working vehicle is in the stopped state on the inclined ground surface, a gauge provided in the housing member may not be able to correctly indicate a remaining amount of the fluid. For example, when the working vehicle is a large dump truck that operates in a mining site of a mine, a housing member for fluid provided in the dump truck is also large. When the housing member is large, a position of an end portion of the housing member changes greatly even when an inclination of the ground surface is slight. Therefore, when the gauge is provided at the end portion of the housing member, there is a high possibility that the gauge is not able to correctly indicate a remaining amount of the fluid.

An aspect of the present invention has an object to provide a working vehicle that can correctly indicate a remaining amount of fluid.

Solution to Problem

According to an aspect of the present invention, a working vehicle comprises: a housing member in which fluid is housed; and a gauge that indicates a remaining amount of the fluid in the housing member, wherein the gauge is disposed at a central portion of the housing member in a longitudinal direction.

Advantageous Effects of Invention

According to an aspect of the present invention, a working vehicle that can correctly indicate a remaining amount of fluid is provided.

DESCRIPTION OF EMBODIMENTS

In the following, an embodiment according to the present invention will be described with reference to the drawings. However, the present invention is not limited to this embodiment. The components of the embodiment described below can optionally be combined. Furthermore, there may be a case where some of the components are not used.

In the following description, a positional relationship among respective portions will be described using the terms "vertical direction", "left-right direction", and "front-rear direction". The vertical direction refers to a direction perpendicular to a ground contact surface of a wheel of a working vehicle which is in contact with the ground surface. The left-right direction refers to a direction parallel to a rotation axis of a wheel which is not steered among a plurality of wheels of the working vehicle. In addition, the left-right direction is synonymous with a vehicle width direction of the working vehicle. The front-rear direction refers to a direction perpendicular to the left-right direction and the vertical direction.

An upper side refers to one direction in the vertical direction, and the direction separating from the ground contact surface of the wheel. A lower side refers to a direction opposite to the upper side in the vertical direction, and the direction approaching the ground contact surface of the wheel. A left side refers to one direction in the left-right direction, and the direction in a left side based on a driver seated on a seat of the working vehicle when the seat on which the driver of the working vehicle sits and a steering wheel operated by the driver are provided. A right side refers to a direction opposite to the left side in the left-right direction, and the direction in a right side based on the driver seated on the seat of the working vehicle. A front side refers to one direction in the front-rear direction, and the direction from the seat toward the steering wheel. A rear side refers to a direction opposite to the front side in the front-rear direction, and the direction from the steering wheel toward the seat.

Moreover, an upper portion refers to a portion at an upper side of a member or space in the vertical direction, and the portion separated from the ground contact surface of the wheel. A lower portion refers to a portion at a lower side of the member or the space in the vertical direction, and the portion close to the ground contact surface of the wheel. A left portion refers to a portion at a left side of the member or the space based on the driver seated on the seat of the working vehicle. A right portion refers to a portion at a right side of the member or the space based on the driver seated on the seat of the working vehicle. A front portion refers to a portion at a front side of the member or the space in the front-rear direction. A rear portion refers to a portion at a rear side of the member or the space in the front-rear direction.

[Working Vehicle]

Figure 1:
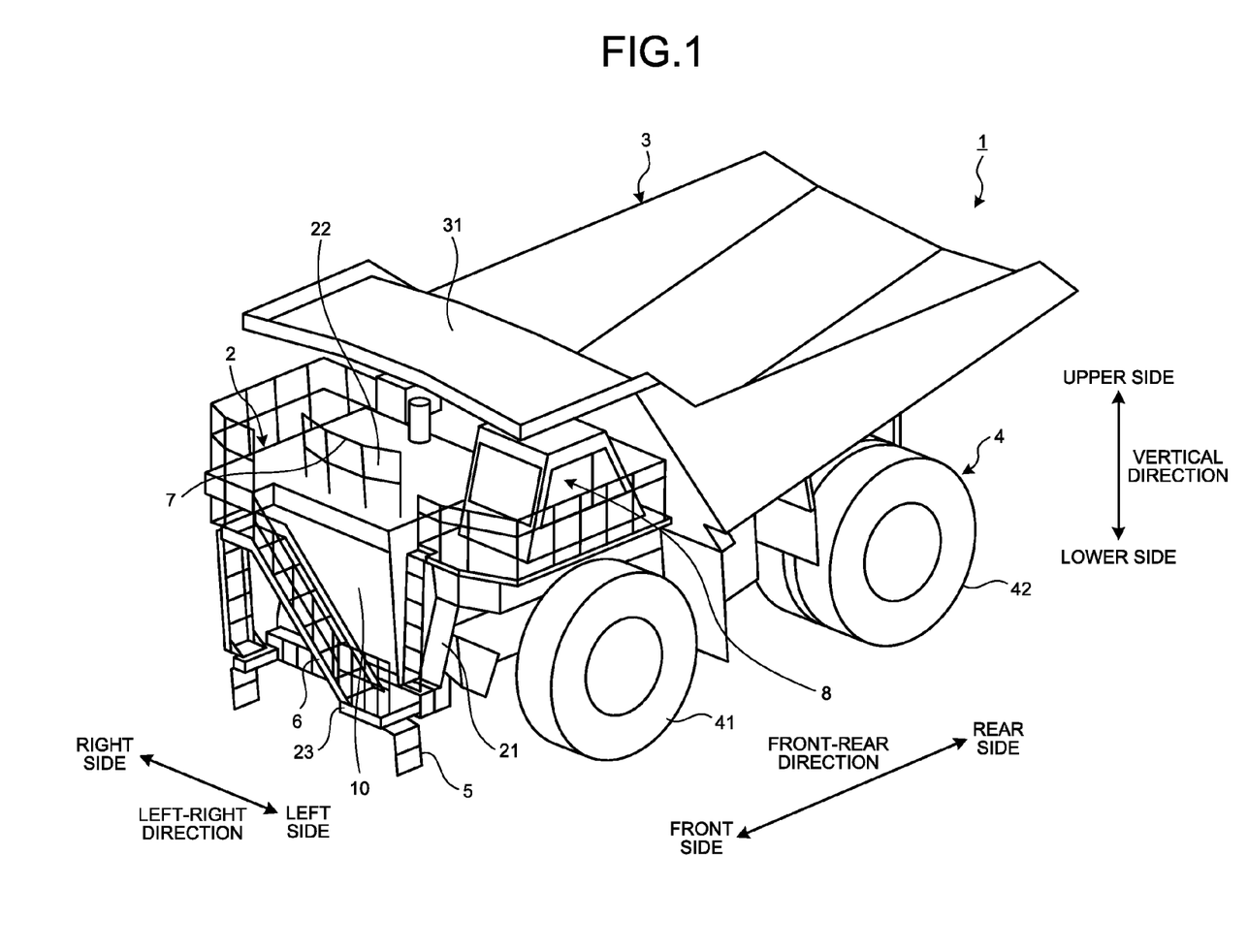
FIG. 1 is a perspective view illustrating an example of a working vehicle according to the present embodiment.

FIG. 1 is a perspective view illustrating an example of a working vehicle 1 according to the present embodiment. In the present embodiment, an example in which a dump truck 1 is the working vehicle 1 will be described. The dump truck 1 is a self-propelled off-road dump truck that operates in a mining site of a mine. The dump truck 1 is a rigid-frame type. Note that, the dump truck 1 may be an articulate type.

As illustrated in FIG. 1, the dump truck 1 includes a vehicle main body 2, a dump body 3 supported by the vehicle main body 2 and on which a cargo is loaded, and a traveling device 4 that supports the vehicle main body 2 and is movable.

The vehicle main body 2 has a frame 21, a floor deck 22 provided at an upper portion of the frame 21, and a lower deck 23 provided at a lower portion of the frame 21. The frame 21 supports the traveling device 4.

A movable ladder 5 is provided on the lower deck 23. An inclined ladder 6 is provided between the lower deck 23 and the floor deck 22. A lower end portion of the inclined ladder 6 is connected to a left portion of the lower deck 23, and an upper end portion of the inclined ladder 6 is connected to a right portion of the floor deck 22. A handrail 7 is provided in front of the floor deck 22.

The vehicle main body 2 has an operating room 8. The operating room 8 is disposed at least on a portion of the floor deck 22. In the present embodiment, the operating room 8 is provided on a left portion of the floor deck 22. At least a portion of the floor deck 22 is disposed in front of the operating room 8. In addition, at least a portion of the floor deck 22 is disposed on a right side of the operating room 8.

A driver boards on the operating room 8. A seat on which the driver sits is provided in the operating room 8. Furthermore, a plurality of operation devices disposed in the operating room 8 is operated by the driver. The operation devices disposed in the operating room 8 include at least a steering wheel. As described above, the front side refers to the direction from the seat toward the steering wheel. The driver adjusts a traveling direction of the dump truck 1 by operating the steering wheel.

When the driver boards on the operating room 8, the driver, after climbing the movable ladder 5 at a left portion of the vehicle main body 2 and moving to the lower deck 23, climbs the inclined ladder 6 and moves to the right portion of the floor deck 22. Then, the driver who has arrived at the right portion of the floor deck 22 walks toward the left portion of the floor deck 22. Thereafter, the driver who has arrived at the left portion of the floor deck 22 moves to a left portion of the operating room 8, opens a door provided at the left portion of the operating room 8, and boards on the operating room 8. The floor deck 22 is a portion of a path for the driver or an inspector to access to the operating room 8.

The cargo is loaded on the dump body 3. The dump body 3 can stand or sit by an actuator such as a hydraulic cylinder. The actuator is disposed between the vehicle main body 2 and the dump body 3, and can cause the dump body 3 to stand or sit. The dump body 3 is adjusted by the actuation of the actuator so as to take a loading posture and/or a standing posture. The loading posture refers to a posture in which the dump body 3 is, within a movable range of the dump body 3, lowered to the most to be at the closest to the vehicle main body 2 and seated. The standing posture refers to a posture in which the dump body 3 is, within the movable range of the dump body 3, raised to the most to be at the farthest from the vehicle main body 2. When the dump body 3 is in the loading posture, the cargo is loaded on the dump body 3 and the dump truck 1 can travel. When the dump body 3 is in the standing posture, the cargo is discharged from the dump body 3.

In the present embodiment, the dump truck 1 is a rear-dumping type, and the cargo is discharged from the dump body 3 by inclining the dump body 3 to the rear side. Note that, the dump truck 1 may be a side-dumping type that discharges the cargo from the dump body 3 by inclining the dump body 3 to the left side or the right side.

The dump body 3 has a protector 31. The protector 31 is a flange portion disposed at a front portion of the dump body 3. In the loading posture, the protector 31 of the dump body 3 is disposed above the operating room 8. Moreover, in the loading posture, the protector 31 of the dump body 3 is disposed above a portion of the floor deck 22.

The traveling device 4 includes front wheels 41 and rear wheels 42. The rear wheels 42 are disposed behind the front wheels 41. The front wheels 41 are each disposed at a left side and a right side of the vehicle main body 2. The rear wheels 42 are each disposed at the left side and the right side of the vehicle main body 2. The rear wheels 42 at the left side and right side each include two tires. That is, the dump truck 1 according to the present embodiment is a four-wheel vehicle, and the number of tires used is two in the front wheels 41 and four in the rear wheels 42.

The traveling device 4 is actuated by power generated by a power generation device provided in the vehicle main body 2. The power generation device includes an internal combustion engine such as a diesel engine, and/or an electric motor.

The front wheel 41 rotates about a rotation axis. The rear wheel 42 rotates about a rotation axis. The rear wheel 42 rotates and the traveling device 4 travels by the power generated by the power generation device. The front wheels 41 are steered by the operation of the steering wheel by the driver. In the present embodiment, the rear wheels 42 are not steered by the operation of the steering wheel. As described above, the left-right direction refers to the direction parallel to the rotation axis of the wheel which is not steered among the plurality of wheels of the working vehicle 1. In the present embodiment, the left-right direction refers to a direction parallel to the rotation axis of the rear wheel 42.

[Radiator]

Figure 2:
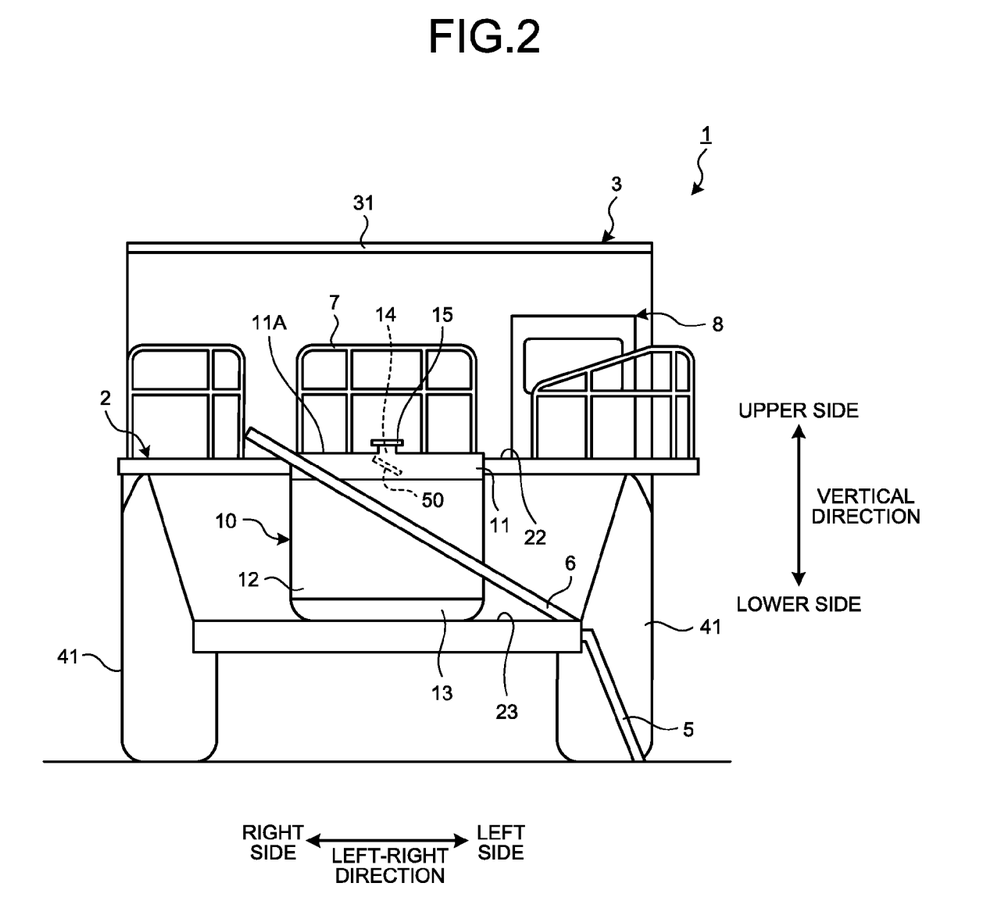
FIG. 2 is a schematic view of the working vehicle according to the present embodiment as viewed from the front.
Figure 3:
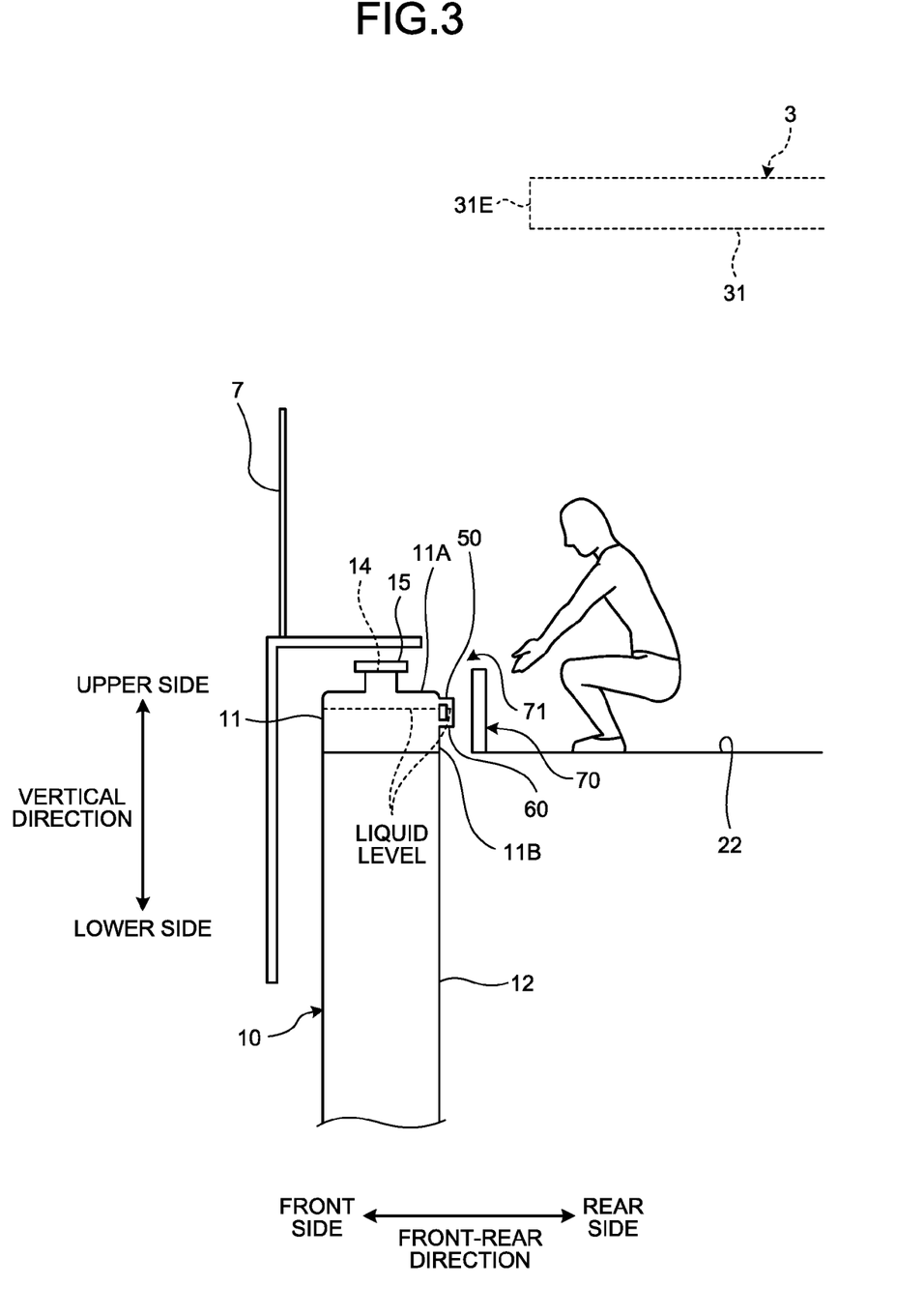
FIG. 3 is a schematic view of a portion of the working vehicle according to the present embodiment as viewed from a left side.

FIG. 2 is a schematic view of the dump truck 1 according to the present embodiment as viewed from the front. In FIG. 2, the structure of the dump truck 1 illustrated in FIG. 1 is partially omitted. FIG. 3 is a schematic view of a portion of the dump truck 1 according to the present embodiment as viewed from the left side. As illustrated in FIGS. 1, 2 and 3, the dump truck 1 has a radiator 10. The radiator 10 is a housing member in which cooling water (coolant), which is fluid, is housed. The cooling water is liquid. The radiator 10 is disposed at a front portion of the vehicle main body 2.

In the vertical direction, the radiator 10 is disposed between the lower deck 23 and the upper deck 22. In the left-right direction, the radiator 10 is disposed at a central portion of the vehicle main body 2.

As illustrated in FIGS. 2 and 3, a dimension of the radiator 10 in the left-right direction is longer than a dimension of the radiator 10 in the front-rear direction. In the following description, the left-right direction of the radiator 10 is appropriately referred to as a longitudinal direction of the radiator 10.

In the present embodiment, an outer shape of the radiator 10 and a shape of a housing space of the radiator 10 in which the cooling water is housed are substantially similar to each other. The housing space of the radiator 10 is an internal space of the radiator 10 in which the cooling water is housed. As described later, the radiator 10 has an upper tank 11, a core tank 12, and a lower tank 13. The housing space of the radiator 10 includes an internal space of the upper tank 11 in which the cooling water is stored, an internal space of the core tank 12, and an internal space of the lower tank 13. When the outer shape of the radiator 10 is a rectangular shape, the housing space of the radiator 10 is also a rectangular shape. The dimension of the radiator 10 includes a dimension of the housing space of the radiator 10 in which the cooling water is housed. The longitudinal direction of the radiator 10 and the longitudinal direction of the housing space of the radiator 10 are the same.

A central portion of the radiator 10 in the longitudinal direction refers to a portion in a central portion of the housing space divided into D equal portions when the housing space of the radiator 10 in which the cooling water is housed is divided into D equal portions in the longitudinal direction.

The radiator 10 has the upper tank 11, the core tank 12, and the lower tank 13. A radiator core is disposed in the core tank 12. The upper tank 11 has a supply port 14 for supplying the cooling water to the radiator 10. A predetermined amount of the cooling water is stored in the internal space of the upper tank 11. The cooling water is supplied to the radiator 10 through the supply port 14. The supply port 14 is closed by a cap 15. The supply port 14 is provided in a central portion of the upper tank 11 in the longitudinal direction.

[Gauge]

Figure 4:
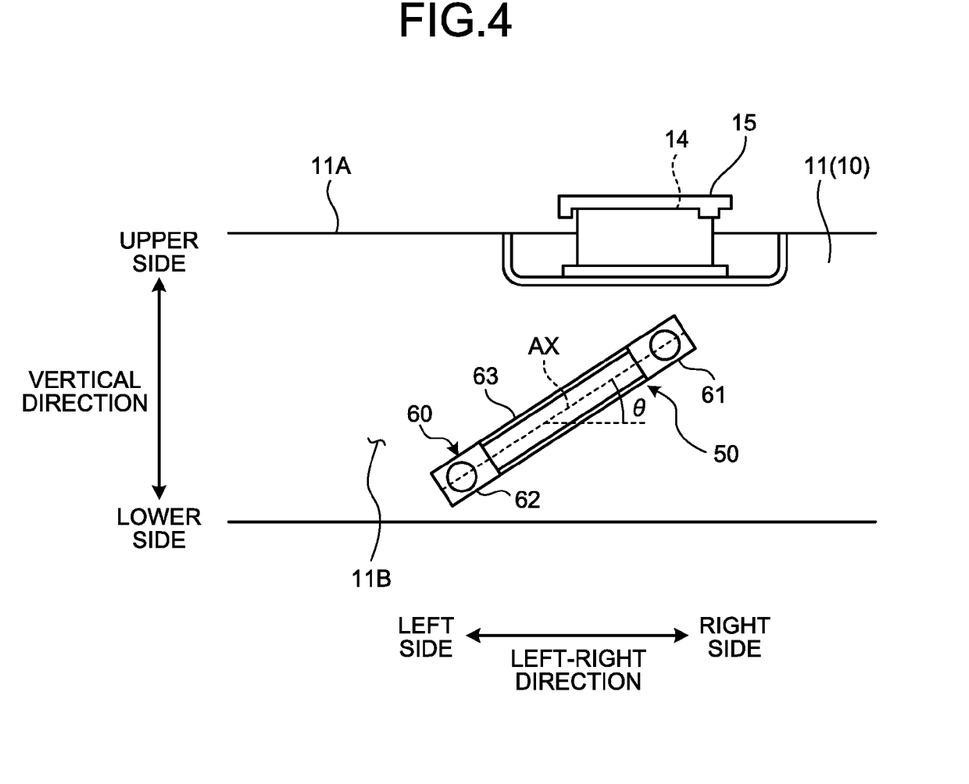
FIG. 4 is a schematic view of a portion of an upper tank according to the present embodiment as viewed from behind.
Figure 5:
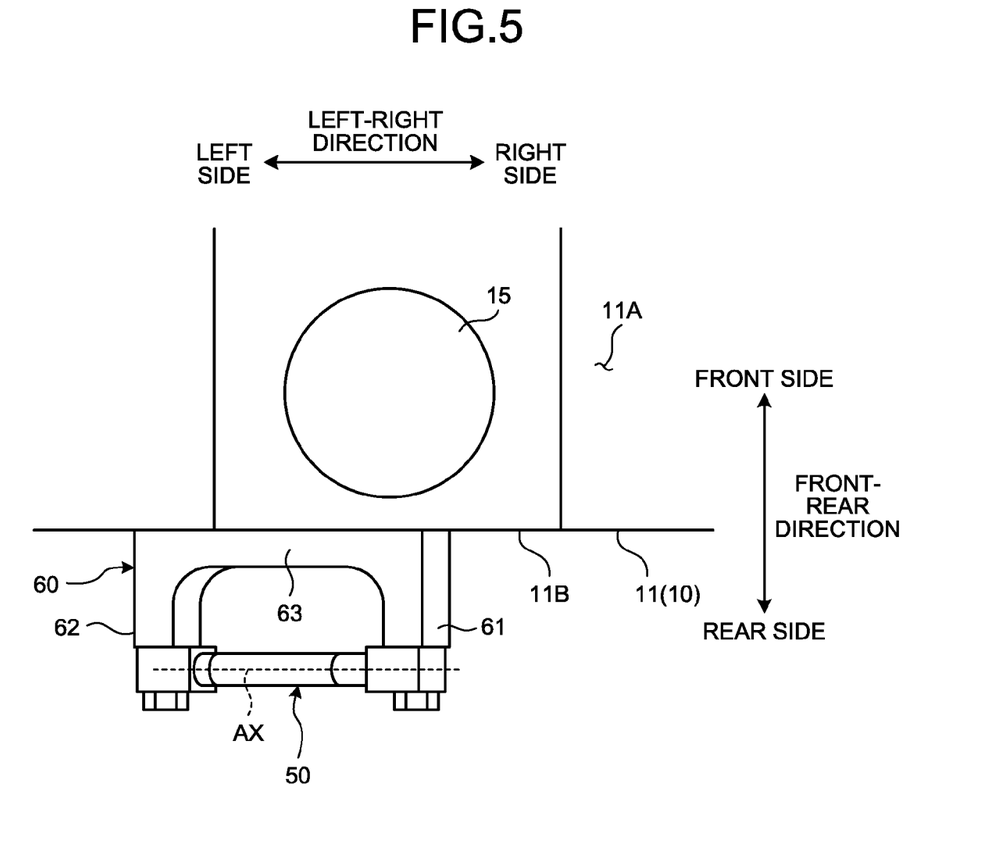
FIG. 5 is a schematic view of a portion of the upper tank according to the present embodiment as viewed from above.

Next, a gauge 50 according to the present embodiment will be described using FIGS. 2, 3, 4, and 5. FIG. 4 is a schematic view of a portion of the upper tank 11 according to the present embodiment as viewed from behind. FIG. 5 is a schematic view of a portion of the upper tank 11 according to the present embodiment as viewed from above.

As illustrated in FIGS. 2, 3, 4, and 5, the dump truck 1 includes the gauge 50 that indicates a remaining amount of the cooling water in the radiator 10. The gauge 50 is a so-called level gauge. In the following description, the gauge 50 is appropriately referred to as a level gauge 50.

The level gauge 50 is connected to an upper portion of the radiator 10. As illustrated in FIG. 2, in the present embodiment, the level gauge 50 is disposed at the central portion of the radiator 10 in the longitudinal direction. As described above, in the present embodiment, the housing space of the radiator 10 is substantially a rectangular shape. The central portion of the radiator 10 in the longitudinal direction refers to the central portion in an upper portion of the housing space of the radiator 10 in the longitudinal direction.

The upper tank 11 has an upper surface 11A facing up, and a rear surface 11B facing down. The level gauge 50 is connected to the rear surface 11B of the upper tank 11.

The level gauge 50 is a long rod-shaped member and has a central axis AX. As illustrated in FIG. 5, the level gauge 50 is connected to the rear surface 11B of the upper tank 11 through a connecting member 60. The connecting member 60 has a base portion 63, a first holding portion 61, and a second holding portion 62. The base portion 63 is connected to the rear surface 11B of the upper tank 11. The first holding portion 61 is connected to the base portion 63 and holds one end portion of the level gauge 50. The second holding portion 62 is connected to the base portion 63 and holds the other end portion of the level gauge 50. A gap is formed between the base portion 63 and the level gauge 50.

As illustrated in FIG. 4, the level gauge 50 inclines to the upper surface 11A of the upper tank 11 in the upper tank 11 provided in the upper portion of the radiator 10. That is, the level gauge 50 is provided in the upper tank 11 so that the central axis AX of the level gauge 50 inclines to a virtual vertical axis extending in the vertical direction and to a virtual left-right axis extending in the left-right direction.

In the present embodiment, the level gauge 50 is provided in the upper tank 11 so that the central axis AX of the level gauge 50 is perpendicular to a virtual front-rear axis extending in the front-rear direction. In other words, the central axis AX of the level gauge 50 is disposed in parallel with a predetermined plane including the vertical axis and the left-right axis. The level gauge 50 is provided in the upper tank 11 so that the central axis AX inclines to a horizontal plane in the predetermined plane. In the present embodiment, an angle θ formed by the horizontal plane and the central axis AX is 30[°] to 45[°].

As illustrated in FIG. 3, the radiator 10 is disposed in front of the floor deck 22. The level gauge 50 is disposed so as to be adjacent to the floor deck 22. The level gauge 50 is disposed between the handrail 7 and the floor deck 22 in the front-rear direction.

In the upper surface 11A of the upper tank 11, the supply port 14 is provided in the central portion of the radiator 10 in the longitudinal direction. In the rear surface 112 of the upper tank 11, the level gauge 50 is provided in the central portion of the radiator 10 in the longitudinal direction. The level gauge 50 is disposed so as to be adjacent to the supply port 14.

Furthermore, when the dump body 3 is in the loading posture, the level gauge 50 is disposed in front of the protector 31 of the dump body 3. The level gauge 50 is disposed at least in front of a front end portion 31E of the protector 31.

As illustrated in FIG. 3, in the present embodiment, the dump truck 1 includes a cover member 70 disposed at least on a portion of a periphery of the radiator 10. The cover member 70 protects the radiator 10. In addition, the cover member 70 protects the level gauge 50. In the present embodiment, at least a portion of the cover member 70 faces the upper surface 11A of the upper tank 11. Moreover, at least a portion of the cover member 70 faces the rear surface 11B of the upper tank 11.

An opening portion 71 is provided in a portion of the cover member 70. At least a portion of the level gauge 50 is disposed at an inner side of the opening portion 71.

The internal space of the upper tank 11 and the internal space of the level gauge 50 are connected to each other through a flow path (not illustrated) provided inside the connecting member 60. As illustrated in FIG. 3, the heights of a liquid level of the cooling water stored in the internal space of the upper tank 11 and a liquid level of the cooling water in the internal space of the level gauge 50 in the vertical direction are maintained at the same height. That is, the liquid level of the cooling water stored in the internal space of the upper tank 11 and the liquid level of the cooling water in the internal space of the level gauge 50 are disposed in the same plane. The inspector can observe the level gauge 50 through the opening portion 71. The inspector can check the remaining amount of the cooling water in the radiator 10 by observing the level gauge 50. Note that, the inspector and the driver may be the same person, or the inspector and the driver may be different.

Figure 6:
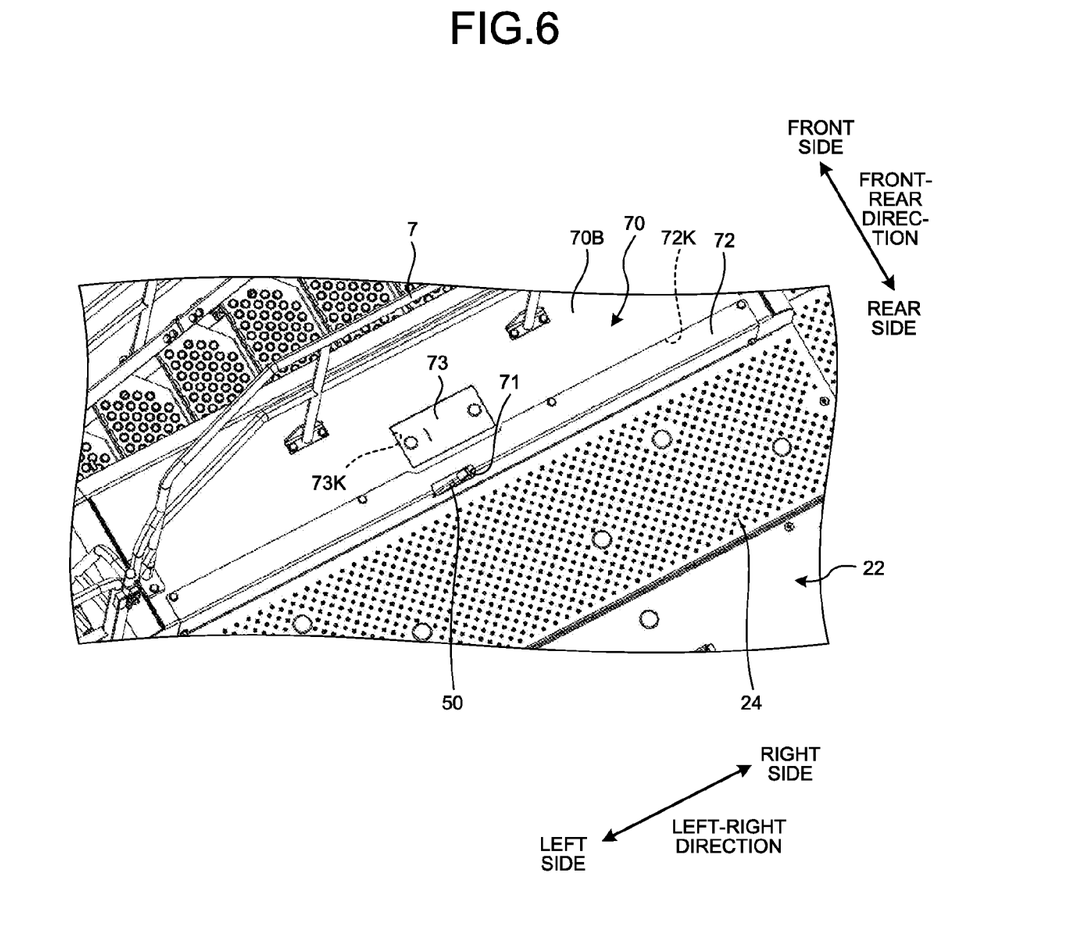
FIG. 6 is a view of portions of a floor deck, a cover member, and a handrail according to the present embodiment as viewed from above.
Figure 7:
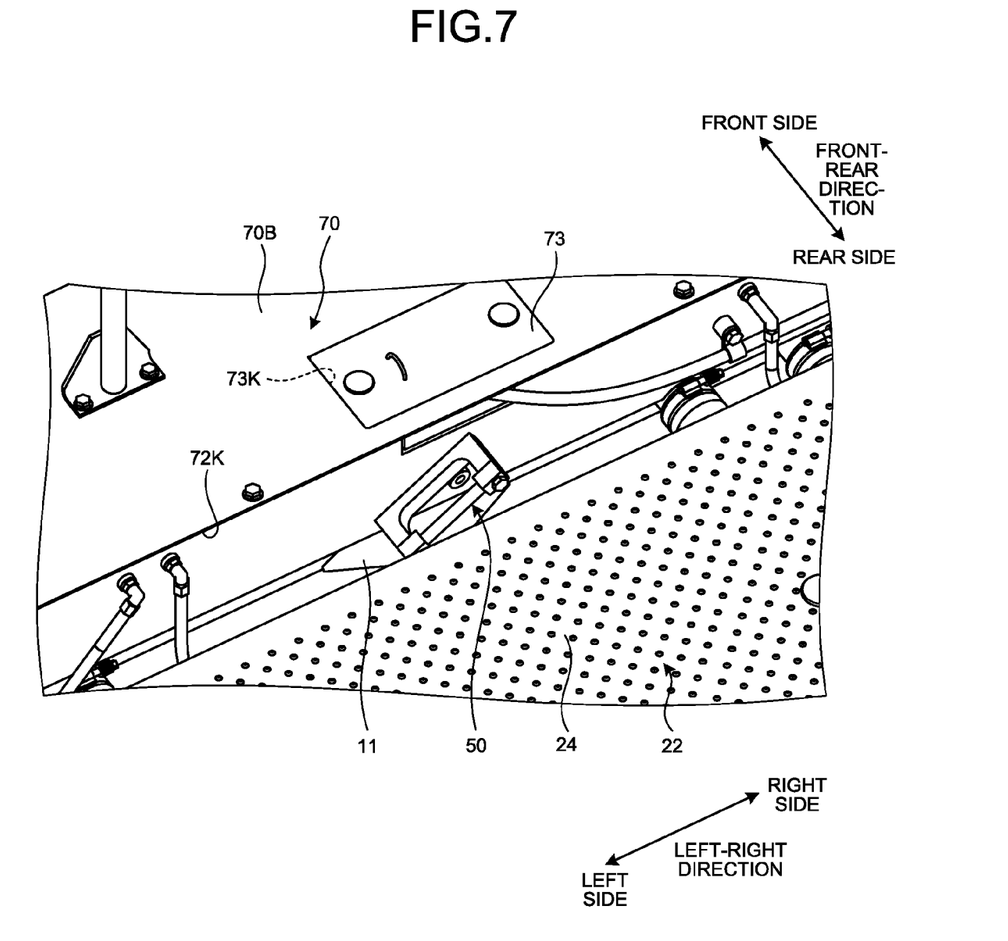
FIG. 7 is a view illustrating a state in which a first lid is removed from a base member of the cover member according to the present embodiment.
Figure 8:
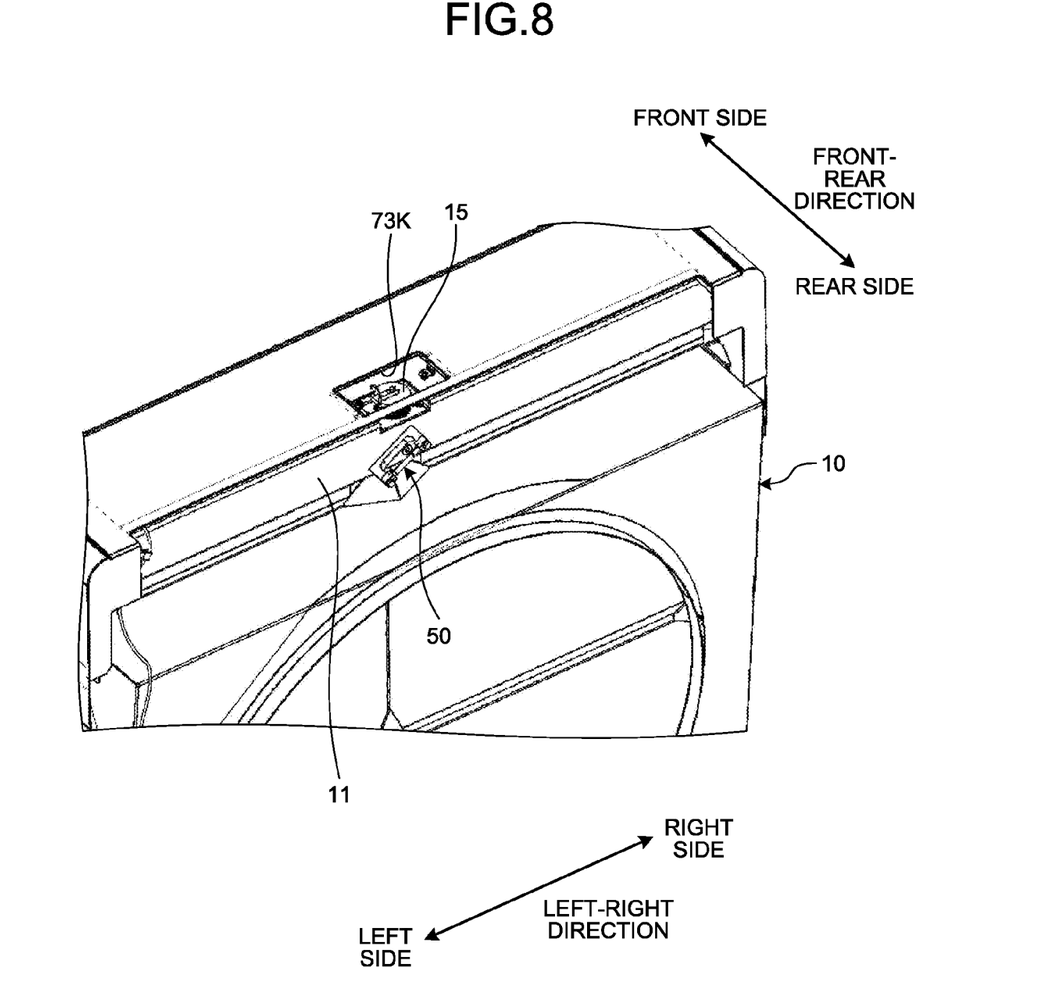
FIG. 8 is a view illustrating a state in which the first lid, a second lid, and a nonslip plate are removed from the base member of the cover member according to the present embodiment.

FIGS. 6, 7, and 8 are specific examples illustrating a portion of the dump truck 1 according to the present embodiment.

FIG. 6 is a view of portions of the floor deck 22, the cover member 70, and the handrail 7 according to the present embodiment as viewed from above. As illustrated in FIG. 6, the cover member 70 is disposed in front of the floor deck 22. The opening portion 71 is provided in the portion of the cover member 70. At least the portion of the level gauge 50 is disposed at the inner side of the opening portion 71. Therefore, the inspector of the floor deck 22 can visually check the level gauge 50 through the opening portion 71.

Moreover, the handrail 7 is provided in front of the floor deck 22. The handrail 7 is, for example, supported by the cover member 70. The level gauge 50 is disposed in front of the floor deck 22, and is adjacent to a front end portion of the floor deck 22. The level gauge 50 is disposed between the handrail 7 and the floor deck 22 in the front-rear direction.

In the present embodiment, the floor deck 22 includes a nonslip plate 24. The nonslip plate 24 has an upper surface, and a plurality of recessed portions or openings provided in the upper surface. The nonslip plate 24 has the plurality of recessed portions or openings in the upper surface, thereby suppressing slipping of the inspector who walks on the upper surface of the nonslip plate 24.

The level gauge 50 is adjacent to a front end portion of the nonslip plate 24. Therefore, when the inspector observes the level gauge 50 through the opening portion 71 or supplies the cooling water from the supply port 14 to the radiator 10, as described later, the inspector can inspect the remaining amount of the cooling water or supply the cooling water, respectively, without slipping. In addition, the handrail 7 is provided in front of the nonslip plate 24 and the level gauge 50. Therefore, accidental falling of the inspector, who is visually checking the level gauge 50 or supplying the cooling water, is suppressed.

The cover member 70 has a base member 70B, a first lid 72, and a second lid 73. The first lid 72 is provided on a portion of the base member 70B, and closes a first opening 72K. The second lid 73 is provided on a portion of the base member 70B, and closes a second opening 73K. In the present embodiment, the opening portion 71 is provided in the first lid 72.

FIG. 7 is a view illustrating a state in which the first lid 72 is removed from the base member 70B of the cover member 70 according to the present embodiment. As illustrated in FIGS. 6 and 7, the first opening 72K is long in the left-right direction. By removing the first lid 72 from the first opening 72K, the inspector can sufficiently observe or inspect not only the level gauge 50 but also the upper tank 11.

FIG. 8 is a view illustrating a state in which the first lid 72, the second lid 73, and the nonslip plate 24 are removed from the base member 70B of the cover member 70 according to the present embodiment. As illustrated in FIG. 8, the cap 15 is disposed in the second opening 73K. The cap 15 appears when the second lid 73 is removed from the second opening 73K. By removing the second lid 72 and the cap 15, the inspector can supply the cooling water from the supply port 14 to the radiator 10.

When only the supplying of the cooling water is performed, the inspector removes the second lid 73, but does not need to remove the first lid 72 and the nonslip plate 24. In other words, the supplying of the cooling water can be performed by removing only a minimum member (lid) and thus, no load, such as the removal of a large and heavy member, is given to the inspector. When the inspector determines that the remaining amount of the cooling water is small by observing the level gauge 50 through the opening portion 71, the inspector can supply the cooling water from the supply port 14 to the radiator 10 by removing the second lid 73 and removing the cap 15. After the supplying of the cooling water is completed, the cap 15 and the second lid 73 are mounted by the inspector.

[Inspection Method]

Next, a method for inspecting the remaining amount of the cooling water according to the present embodiment will be described. In the present embodiment, there will be described an example in which, in the pre-operation inspection of the dump truck 1, the driver of the dump truck 1, who is the inspector, observes the level gauge 50 provided in the radiator 10 to check the remaining amount of the cooling water in the radiator 10.

In order to board on the operating room 8, the driver, after climbing the movable ladder 5 at the left portion of the vehicle main body 2 and moving to the lower deck 23, climbs the inclined ladder 6. Accordingly, the driver arrives at the right portion of the floor deck 22.

Then, the driver who has arrived at the right portion of the floor deck 22 walks toward the left portion of the floor deck 22. The opening portion 71 is provided in a walking path of the driver. Therefore, before moving to the operating room 8, the driver on the floor deck 22 can easily and surely observe the level gauge 50 through the opening portion 71.

Figure 9:
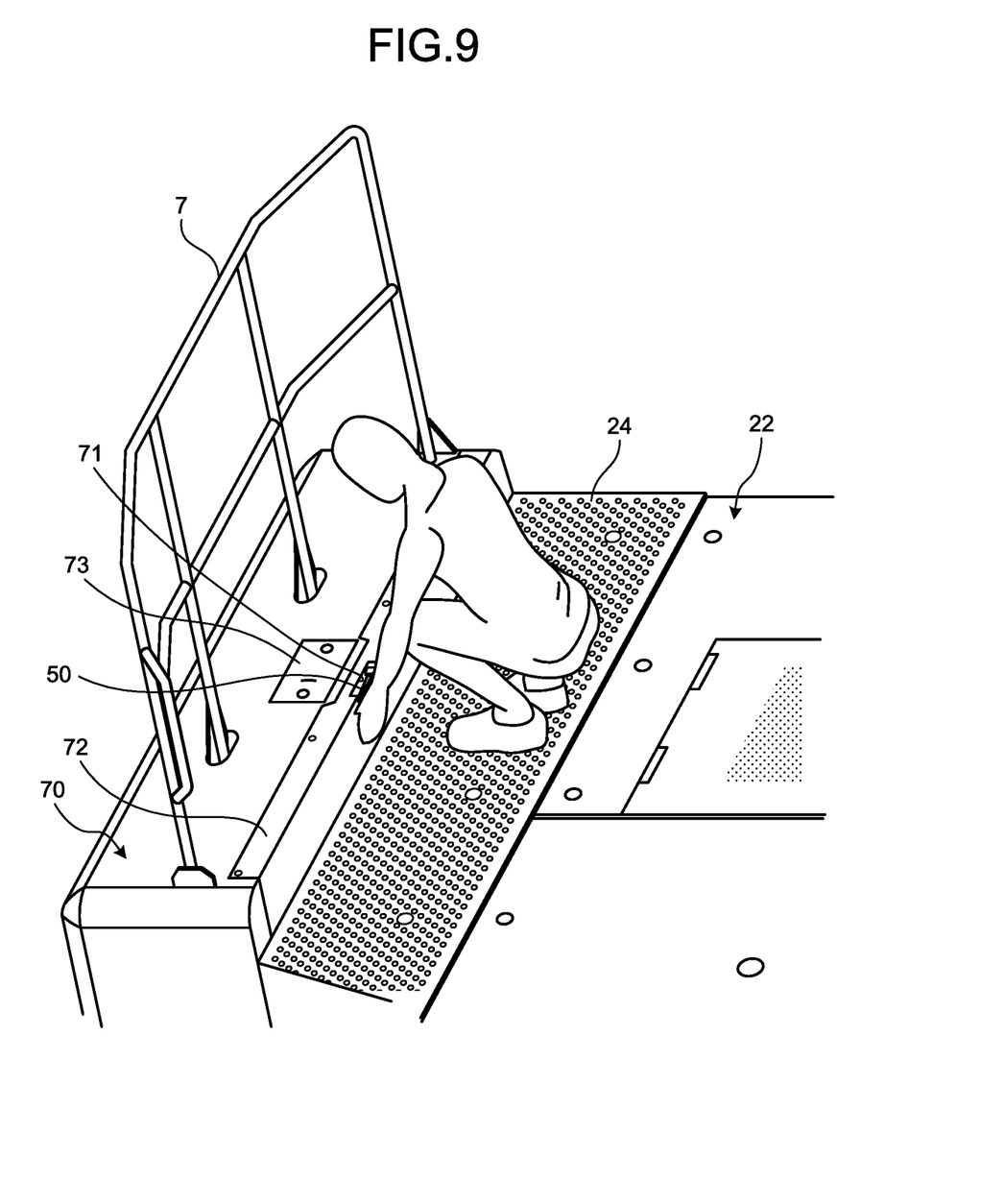
FIG. 9 is a schematic view illustrating a state in which a driver is observing a level gauge through an opening portion in a pre-operation inspection according to the present embodiment.

FIG. 9 is a schematic view illustrating a state in which the driver is observing the level gauge 50 through the opening portion 71 in the pre-operation inspection according to the present embodiment. As illustrated in FIG. 9, the driver can observe the level gauge 50 through the opening portion 71. Through the opening portion 71, the driver observes the level gauge 50 from above. In the present embodiment, the level gauge 50 includes a direct-viewing type liquid level gauge, and inclines to the upper surface 11A of the radiator 10 in the upper portion of the radiator 10. Therefore, even when the driver observes the level gauge 50 from above through the small opening portion 71, the driver can easily and surely observe the liquid level of the cooling water in the level gauge 50.

In the present embodiment, the nonslip plate 24 is provided on the floor deck 22. In addition, the handrail 7 is provided in front of the nonslip plate 24. Therefore, the safety of the foot and the front of the driver who observes the level gauge 50 is ensured.

Moreover, the level gauge 50 is disposed in front of the protector 31 of the dump body 3. The level gauge 50 is disposed at least in front of the front end portion 31E of the protector 31. Accordingly, an upper side of the level gauge 50 is opened and thus, sufficiently illuminated with illumination light such as sunlight. Therefore, the driver can sufficiently observe the level gauge 50.

When the inspector determines that the remaining amount of the cooling water is small by observing the level gauge 50 through the opening portion 71, the inspector can supply the cooling water from the supply port 14 to the radiator 10 by removing the second lid 73 and removing the cap 15. After the supplying of the cooling water is completed, the cap 15 and the second lid 73 are mounted by the inspector.

The driver who has completed the pre-operation inspection walks on the floor deck 22 and boards on the operating room 8. Then, the operation of the dump truck 1 starts.

[Action and Effect]

As described above, according to the present embodiment, the level gauge 50 is disposed at the central portion of the radiator 10 in the longitudinal direction. Therefore, in the pre-operation inspection, even when the vehicle is in a stopped state on an inclined ground surface and thus, the radiator 10 inclines to the horizontal plane, the level gauge 50 can correctly indicate the remaining amount of the cooling water.

Figure 10:
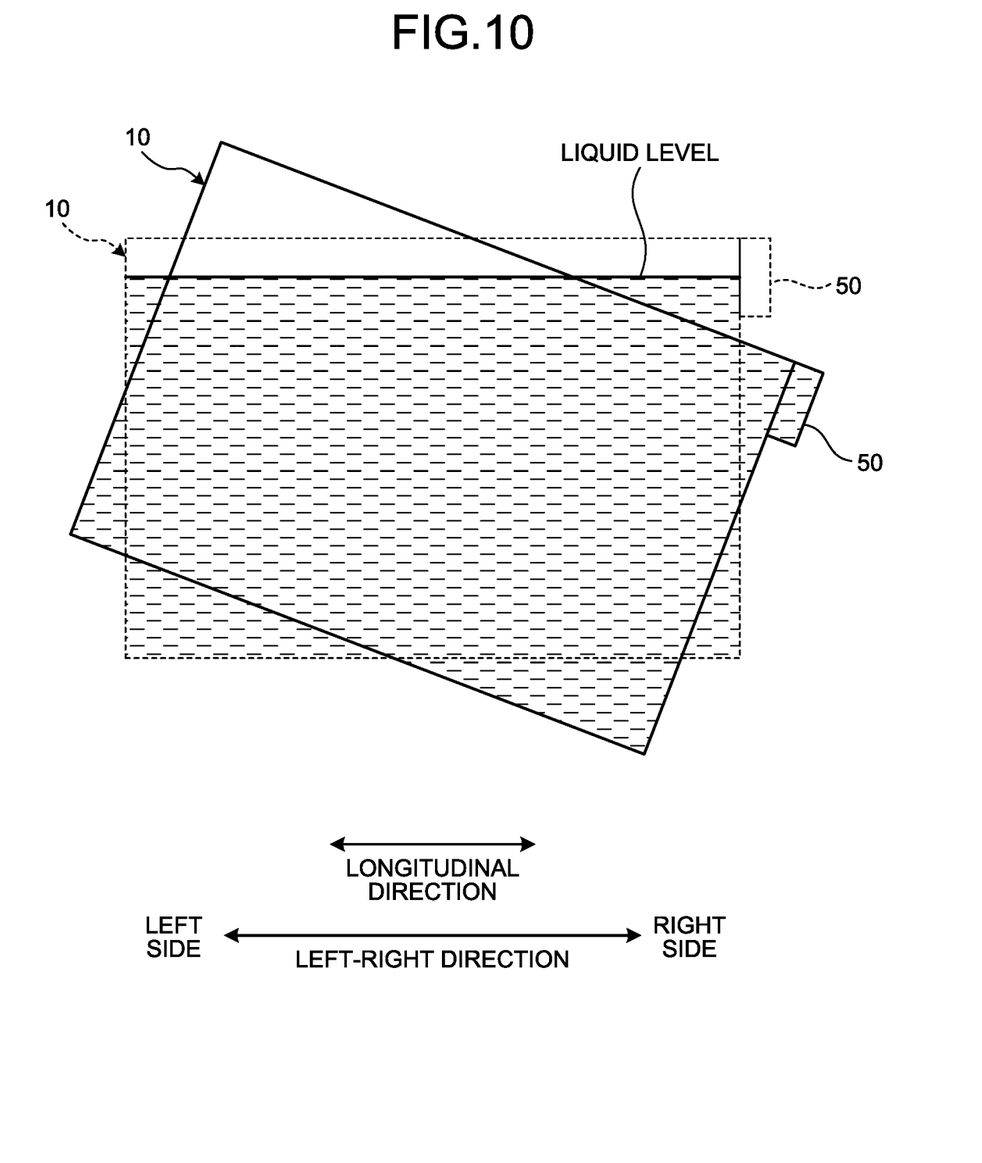
FIG. 10 is a view illustrating action of a radiator according to a comparative example.

FIG. 10 is a view illustrating action of the radiator 10 according to a comparative example. FIG. 10 is a schematic diagram illustrating an example in which the level gauge 50 is provided at an end portion of the radiator 10 in the longitudinal direction.

When the dump truck 1 is in a stopped state on a horizontal ground surface, the radiator 10 is also installed horizontally as illustrated by a dotted line in FIG. 10. In such case, the level gauge 50 can correctly indicate the remaining amount of the cooling water in the radiator 10.

There is a case where the dump truck 1 is in a stopped state on an inclined ground surface. When the dump truck 1 is in the stopped state on the inclined ground surface, the radiator 10 also inclines as illustrated by a solid line in FIG. 10. However, even when the radiator 10 inclines, the liquid level of the cooling water is parallel to the horizontal plane. When the radiator 10 is large and a dimension of the radiator 10 in the longitudinal direction is long, a position of the end portion of the radiator 10 in the longitudinal direction changes greatly in the vertical direction even when an inclination of the ground surface is slight. As illustrated in FIG. 10, when the level gauge 50 is provided at the end portion of the radiator 10 in the longitudinal direction, there is a high possibility that the level gauge 50 is not able to correctly indicate the remaining amount of the cooling water. In the example illustrated in FIG. 10, the level gauge 50 is provided at an end portion on the right side of the radiator 10 in the longitudinal direction, and the level gauge 50 indicates the remaining amount of the cooling water larger than the actual remaining amount. On the other hand, when the level gauge 50 is provided at an end portion on the left side of the radiator 10 in the longitudinal direction, the level gauge 50 indicates the remaining amount of the cooling water smaller than the actual remaining amount. In a large dump truck 1 that operates in a mine, particularly, depending on an attached position of the level gauge 50 in the radiator 10, the accuracy of a remaining-amount indication of the cooling water is affected by the inclination of the ground surface.

Figure 11:
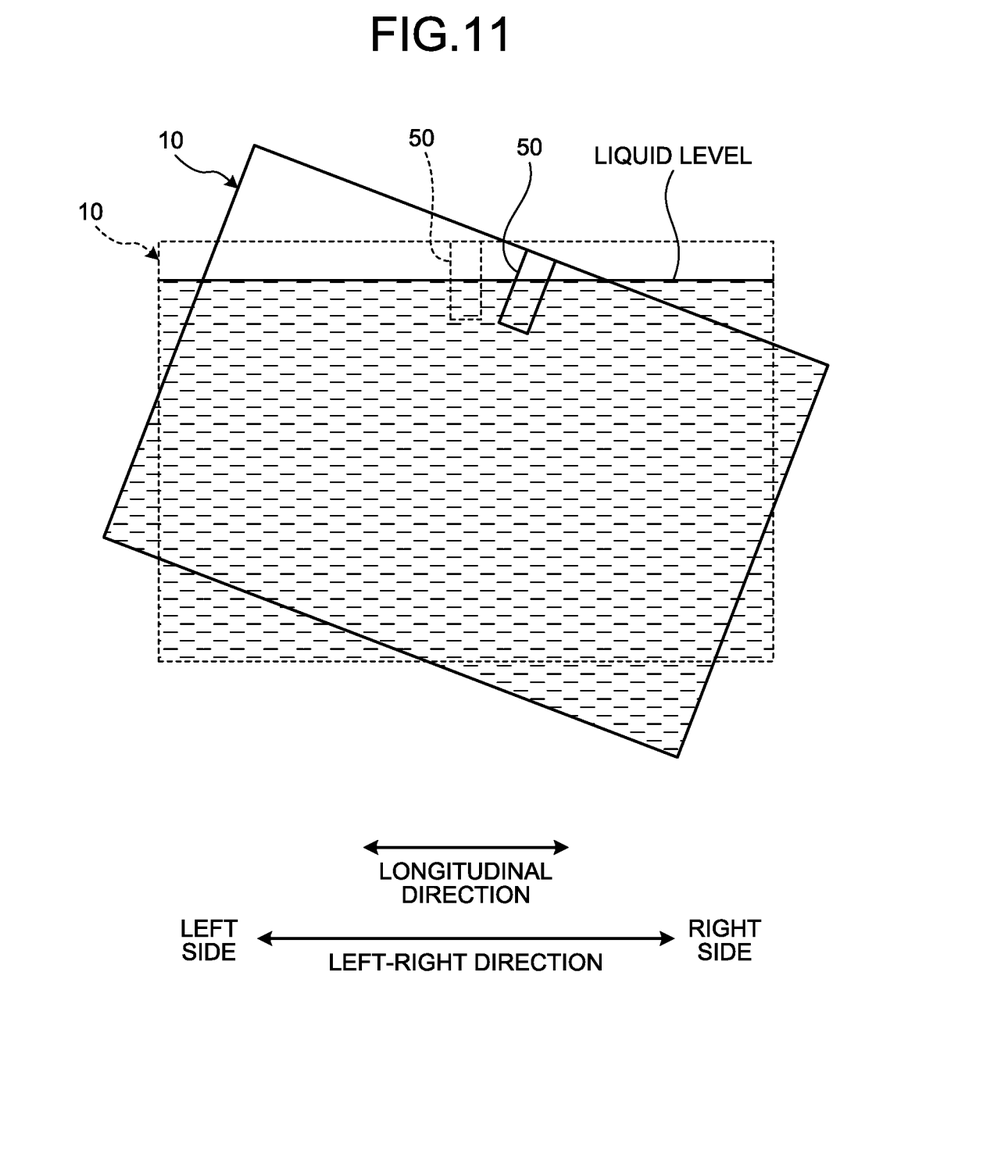
FIG. 11 is a view illustrating action of the radiator according to the present embodiment.

FIG. 11 is a view illustrating action of the radiator 10 according to the present embodiment. FIG. 11 is a schematic diagram illustrating an example in which the level gauge 50 is provided at the central portion of the radiator 10 in the longitudinal direction. When the dump truck 1 is in a stopped state on a horizontal ground surface, the radiator 10 is also installed horizontally as illustrated by a dotted line in FIG. 11. In such case, the level gauge 50 can correctly indicate the remaining amount of the cooling water in the radiator 10.

When the dump truck 1 is in a stopped state on an inclined ground surface, the radiator 10 also inclines as illustrated by a solid line in FIG. 11. However, even when the radiator 10 inclines, the liquid level of the cooling water is parallel to the horizontal plane. Even though the position of the end portion of the radiator 10 in the longitudinal direction changes greatly in the vertical direction when the radiator 10 inclines, the change of a position of the central portion of the radiator 10 in the longitudinal direction is suppressed. That is, when the level gauge 50 is provided at the central portion of the radiator 10 in the longitudinal direction, the level gauge 50 can correctly indicate the remaining amount of the cooling water.

Furthermore, in the present embodiment, the level gauge 50 includes a direct-viewing type liquid level gauge, and is installed so as to incline to the upper surface 11A of the radiator 10 in the upper portion of the radiator 10. When the dump truck 1 is in the stopped state on the horizontal ground surface, the upper surface 11A of the radiator 10 is substantially parallel to the horizontal plane. The level gauge 50 is provided so that the central axis AX of the level gauge 50 inclines; therefore, the visibility of the level gauge 50 improves. As a result, the inspector can easily and surely check the remaining amount of the cooling water by directly observing the level gauge 50 from above.

Moreover, in the present embodiment, the level gauge 50 is disposed so as to be adjacent to the floor deck 22. Accordingly, the inspector can easily observe the level gauge 50 by moving to the floor deck 22. In addition, the driver boards on the operating room 8 by moving from the movable ladder 5 to the lower deck 23, the inclined ladder 6, and the floor deck 22. Since the level gauge 50 is adjacent to the floor deck 22, the remaining-amount inspection of the cooling water is incorporated in a pre-operation movement process, that is, in the middle of the access path to the operating room 8, of the driver. The driver can easily and surely observe, without forgetting, the level gauge 50, and check the remaining amount of the cooling water.

Furthermore, in the present embodiment, the level gauge 50 is disposed between the handrail 7 and the floor deck 22 in the front-rear direction. Accordingly, when the inspector on the floor deck 22 observes the level gauge 50 that exists in front of the floor deck 22, the accidental falling of the inspector at the time of inspecting the cooling water is suppressed since the handrail 7 is provided in front of the level gauge 50.

In the present embodiment, the supply port 14 and the cap 15 are disposed between the handrail 7 and the floor deck 22 in the front-rear direction. Since the handrail 7 is provided in front of the supply port 14 and the cap 15, the accidental falling is also suppressed at the time of supplying the cooling water.

Moreover, in the present embodiment, the level gauge 50 is adjacent to the front end portion of the nonslip plate 24. Therefore, the inspector observes the level gauge 50 in a state of being on the nonslip plate 24, thereby suppressing the slipping of the inspector.

In the present embodiment, the level gauge 50 is disposed in front of the protector 31 of the dump body 3. Accordingly, the illumination light, such as sunlight, is sufficiently applied onto the level gauge 50 without being blocked by the protector 31. As a result, the driver can easily and surely observe the level gauge 50.

Furthermore, in the present embodiment, the radiator 10 has the supply port 14 through which the cooling water is supplied, and the level gauge 50 is disposed so as to be adjacent to the supply port 14. The level gauge 50, the supply port 14, and the cap 15 are linearly disposed in the front-rear direction. Therefore, when the inspector who has observed the level gauge 50 determines that the remaining amount of the cooling water is small, the inspector can supply the cooling water to the radiator 10 through the supply port 14 while observing the level gauge 50. As a result, the inspector can supply an appropriate amount of the cooling water.

Moreover, in the present embodiment, at least the portion of the level gauge 50 is disposed at the inner side of the opening portion 71 provided in the portion of the cover member 70. The level gauge 50 is protected by providing the cover member 70. In addition, by disposing at least the portion of the level gauge 50 in the opening portion 71, the inspector can observe the level gauge 50 through the opening portion 71 without removing the large cover member 70.

In the embodiment described above, the housing member has been the radiator 10, and the level gauge 50 has indicated the remaining amount of the cooling water in the radiator 10. In addition, the fluid housed in the housing member has been the cooling water. However, the housing member that houses the liquid may be an oil tank which houses oil (working oil) for actuating hydraulic equipment, and the level gauge 50 may indicate a remaining amount of the oil as the fluid in the oil tank. Moreover, the housing member that houses the liquid may be a fuel tank which houses fuel in an internal combustion engine, and the level gauge 50 may indicate a remaining amount of the fuel as the fluid in the fuel tank.

In the embodiment described above, the longitudinal direction of the radiator 10 (housing member) and the left-right direction of the dump truck 1 have been the same. However, the longitudinal direction of the radiator 10 (housing member) and the front-rear direction of the dump truck 1 may be the same. Moreover, the level gauge 50 may be provided in the housing member so that the longitudinal direction of the level gauge 50 inclines to the left-right direction of the dump truck 1, or the level gauge 50 may be provided in the housing member so that the longitudinal direction of the level gauge 50 inclines to the front-rear direction of the dump truck 1.

In the embodiment described above, the working vehicle 1 has been the dump truck. However, the working vehicle 1 may be an excavator that has a lower traveling body, an upper swing body, and a working unit, or may be a wheel loader.

The present embodiment has been described above. However, the present embodiment is not limited to the content described above. In addition, the components described above may include components readily conceivable by those skilled in the art, components substantially identical, and components in a so-called equivalent range. Moreover, the components described above can be appropriately combined. Furthermore, various kinds of omission, replacement, and modification may be made in the components in the scope not departing from the gist of the present embodiment.

REFERENCE SIGNS LIST

1 Dump truck (working vehicle)
2 Vehicle main body
3 Dump body
4 Traveling device
5 Movable ladder
6 Inclined ladder
7 Handrail
8 Operating room
10 Radiator
11 Upper tank
11A Upper surface
11B Rear surface
12 Core tank
13 Lower tank
14 Supply port
15 Cap
21 Frame
22 Floor deck
23 Lower deck
24 Nonslip plate
31 Protector
41 Front wheel
42 Rear wheel
50 Gauge
60 Connecting member
61 First holding member
62 Second holding member
63 Base portion
70 Cover member
71 Opening portion
72 First lid
72K First opening
73 Second lid
73K Second opening

The invention claimed is:

1. A dump truck comprising:
    a vehicle main body;
    a housing member disposed at a front portion of the vehicle main body in a front-rear direction and at a central portion of the vehicle main body in a left-right direction, and configured to house fluid therein; and
    a gauge that indicates a remaining amount of the fluid in the housing member, wherein
    a longitudinal direction of the housing member and the left-right direction of the vehicle main body are the same,
    the gauge is disposed at a central portion of the housing member in the longitudinal direction, and
    the gauge includes a direct-viewing type liquid level gauge, and inclines to an upper surface of the housing member in an upper portion of the housing member.

2. The dump truck according to claim 1, comprising a floor deck having at least a portion disposed with an operating room, wherein
    the gauge is adjacent to the floor deck.

3. The dump truck according to claim 2, comprising a handrail provided in front of the floor deck, wherein
    the gauge is disposed between the handrail and the floor deck in a front-rear direction.

4. The dump truck according to claim 3, wherein
    the floor deck includes a nonslip plate, and
    the gauge is adjacent to a front end portion of the nonslip plate.

5. The dump truck according to claim 2, comprising a dump body on which a cargo is loaded, wherein
    the dump body has a protector disposed above the operating room, and
    the gauge is disposed in front of the protector.

6. The dump truck according to claim 1, wherein the housing member has a supply port through which the fluid is supplied, and the gauge is adjacent to the supply port.

7. The dump truck according to claim 1, comprising
a cover member disposed at least on a portion of a periphery of the housing member, wherein
at least a portion of the gauge is disposed at an inner side of an opening portion provided in a portion of the cover member.

8. A dump truck comprising:
a floor deck having at least a portion disposed with an operating room;
a handrail provided in front of the floor deck;
a housing member in which fluid is housed; and
a gauge, adjacent to the floor deck, that indicates a remaining amount of the fluid in the housing member, wherein
the gauge is disposed at a central portion of the housing member in a longitudinal direction,
the gauge includes a direct-viewing type liquid level gauge, and inclines to an upper surface of the housing member in an upper portion of the housing member,
the gauge is disposed between the handrail and the floor deck in a front-rear direction,
the floor deck includes a nonslip plate, and
the gauge is adjacent to a front end portion of the nonslip plate.

* * * * *